(12) United States Patent
Guzzoni

(10) Patent No.: US 7,731,247 B2
(45) Date of Patent: Jun. 8, 2010

(54) DEVICE FOR CONNECTING AND BLOCKING HOLLOW ELEMENTS FOR THE FORMATION OF FLUID DISTRIBUTION PLANTS

(75) Inventor: Paolo Guzzoni, Brescia (IT)

(73) Assignee: TESEO S.r.l., Brescia (IT)

( * ) Notice: Subject to any disclaimer, the term of this patent is extended or adjusted under 35 U.S.C. 154(b) by 1908 days.

(21) Appl. No.: 10/183,886

(22) Filed: Jun. 27, 2002

(65) Prior Publication Data

US 2003/0014855 A1 Jan. 23, 2003

(30) Foreign Application Priority Data

Jul. 18, 2001 (IT) .................. BS 2001 U 000067

(51) Int. Cl.
*F16L 17/00* (2006.01)
(52) U.S. Cl. .................................... 285/370; 285/124.5
(58) Field of Classification Search .................. 285/23, 285/125.1, 149.1, 124.5, 370, 397, 398
See application file for complete search history.

(56) References Cited

U.S. PATENT DOCUMENTS

| 4,082,324 | A | * | 4/1978 | Obrecht | .................. 285/124.5 |
| 4,352,532 | A | * | 10/1982 | Hardin | ........................ 439/191 |
| 4,535,821 | A | * | 8/1985 | Anderson | .................... 137/884 |
| 5,628,599 | A | | 5/1997 | Eakin | |
| 5,769,460 | A | * | 6/1998 | Imai | ............................. 285/18 |
| 5,938,245 | A | * | 8/1999 | Guzzoni | ..................... 285/305 |
| 6,039,358 | A | * | 3/2000 | Stoll et al. | .................... 285/23 |
| 6,179,349 | B1 | * | 1/2001 | Guzzoni | ..................... 285/370 |

FOREIGN PATENT DOCUMENTS

| BE | 869 746 | 12/1978 |
| DE | 2 246 609 | 2/1992 |

* cited by examiner

*Primary Examiner*—Aaron M Dunwoody
(74) *Attorney, Agent, or Firm*—McGlew and Tuttle, P.C.

(57) ABSTRACT

The invention relates to a device for connecting and blocking hollow elements used as piping for fluids, both gaseous and liquids, The hollow elements (11,13) are connectable by plugs or anchoring plates (19) and connecting plate (21), engaging at least one wall of adjacent elements and fixed by anchoring screws (22). At least the connecting plate (21) is provided with protrusions or contact grips (24) designed to physically penetrate into the surface of the elements to be connected when the connecting plate is anchored to the anchoring plate by the screws.

20 Claims, 8 Drawing Sheets

DEVICE FOR CONNECTING AND BLOCKING HOLLOW ELEMENTS FOR THE FORMATION OF FLUID DISTRIBUTION PLANTS

FIELD OF THE INVENTION

The present invention concerns plants for piping fluids, both gaseous and liquids, under pressure or under vacuum and is aimed in particular at an innovative system of linear, angular, T or cross connections of hollow elements, such as hollow bars, relative fittings and accessories for the formation of such plants.

STATE OF THE TECHNIQUE

The achievement and use, as piping, of hollow bars or section pipes, consecutively connectable to form canalisation and distribution plants for fluids in general are well known.

Each hollow bar for such an use is usually made up of an extruded aluminium or aluminium alloy square section. Fundamentally, it has a central longitudinal hole and, along the external walls, C shaped grooves, also longitudinal, opening outwards. The channel shaped grooves are delimited by ribbing or finning achieved by extrusion and are used to anchor the fastenings used to join the hollow bars together and/or supplementary elements to the ends of the assembled bars.

According to a known connecting system, the adjacent ends of the hollow bars and however of hollow elements to be spiced, are connected, in line or at angles, using tubular joints, fundamentally round section, and using plates or coupling brackets inserted and blocked on at least two opposite sides, bridging the adjacent ends of the bars themselves.

Each tubular joint, which can be straight, at an angle, T or cross shaped, depending on the needs, has cylindrical parts to be inserted into the central hole of the bars to be connected with the insertion of at least one seal to be positioned between the joint and the internal surface of the hole of the bars.

Each plate or bracket used in connecting rests on the surface of an external wall of the adjacent bars and is anchored, by means of screws, to plugs or anchoring plates inserted by sliding into the channel shaped grooves of the bars so as to hold the latter and the joint tightly together.

A similar method of connecting the piping bars is efficient and practical, but may result in not being sufficiently reliable for large sections of piping and where high delivery pressures are used, that is when the thrust which tends to force apart the joined parts is very high. In this case in fact, the thrust in play may cause the plugs or anchoring plates to slide in their grooves and the connecting plates to slide on the external surface of the bars, thus jeopardizing the connection between the various components and consequently the efficiency and safety of the plant.

OBJECTS AND SUMMARY OF THE INVENTION

One object of the present invention is to provide and achieve means which fully ensure a static and reliable coupling of hollow bars or section pipes for piping fluids, including piping with large diameters and where operating pressures are very high.

Another object of the present invention is to provide coupling devices able to achieve anchoring of the elements to be connected, not only due to anchoring by screws, but above all due to a physical connection and gripping between at least one of the coupling systems and at least one surface of the connected elements.

These objects and the obvious advantages stemming from them are achieved, in compliance with the invention, by using a coupling system of hollow elements, in particular hollow bars and relative accessories, to form piping for fluids, where each hollow element has a central hole and C shaped grooves running along its walls and opening outwards, where plugs or anchoring plates are provided which can be inserted singularly into the channel shaped grooves of the adjacent elements to be connected, one connecting plate resting on one wall of said adjacent elements, and anchoring screws inserted into holes in this plate and screwed into said anchoring plates to block the plate on said adjacent elements, and wherein at least the connecting plate is provided with protrusions or grips which are designed to physically penetrate into the surface of the elements, attaching themselves to it, to be connected when the plate is anchored to the anchoring plates by the screws.

The protrusions or grips may be of different shapes, as they can be designed as knurling, teeth or protrusions on the surface of the connecting plate facing towards the elements to be connected, and they can be positioned at least around the screw anchoring holes and/or distributed on the flat areas of said plate.

In order to increase even further the closing action or gripping of the connecting system, protrusions or grips can be provided not only on the connecting plate, but also on the anchoring plates. Furthermore, the anchoring plate can be provided with additional holes to receive pins which project from one of the elements to be connected, in particular when connecting two, three or four hollow bars oriented in different directions, where a corner joint, a T or cross joint is used as a coupling unit.

BRIEF DESCRIPTION OF DRAWINGS

Further details of the invention will however become clearer from the following description written in reference to the enclosed indicative but not limiting drawings, in which.

DETAILED DESCRIPTION OF INVENTION

Figure 1:
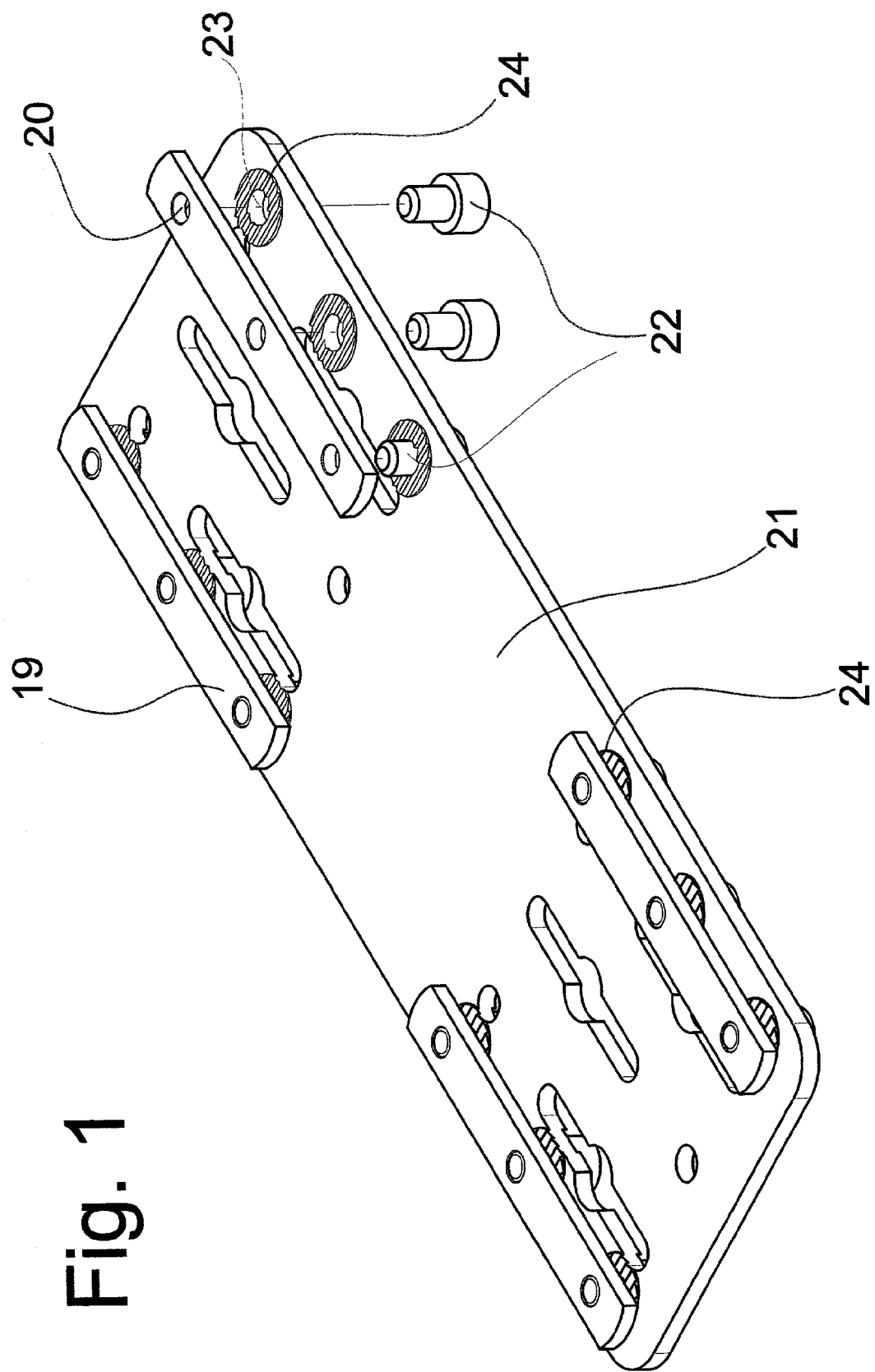
FIG. 1 is a perspective view of the connecting plate in function and in association with the anchoring plates.

In said drawings, 11 indicates a hollow bar is indicated which is connectable to another identical hollow bar through an interposed tubular connection 12 or directly by an end piece or an additional end fitting 13.

Each hollow bar 11, which can also be called a pipe section, has a four-sided section and is extruded aluminium or one of its alloys. It has, as it is well known, a central hole 14, and, along its walls, C shaped, outward facing, channels 15.

Figure 4:
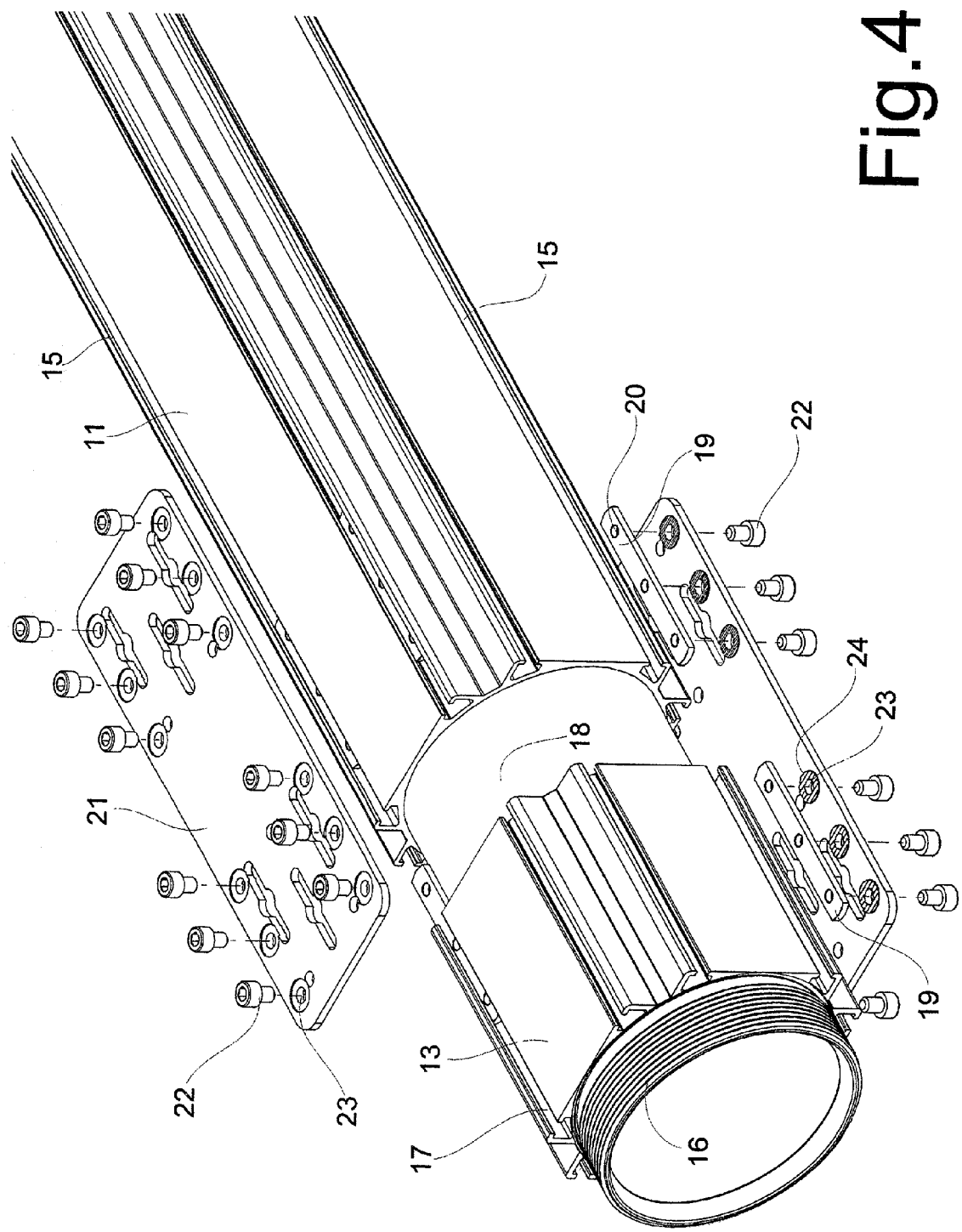
FIG. 4 is a perspective view of a hollow bar and an element or end fitting before being connected.
Figure 5:
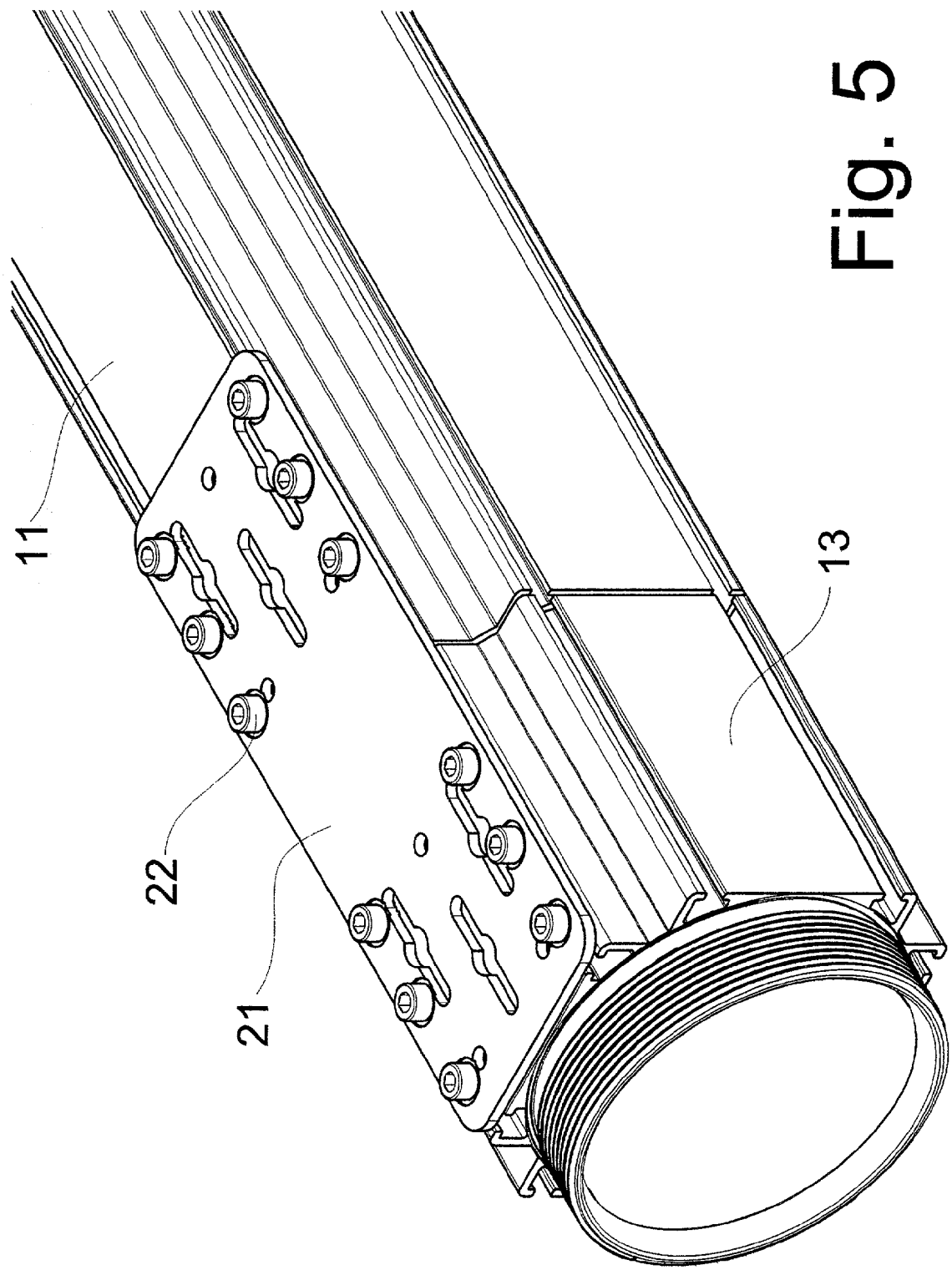
FIG. 5 is a perspective view of the elements in FIG. 4 when assembled.
Figure 6:
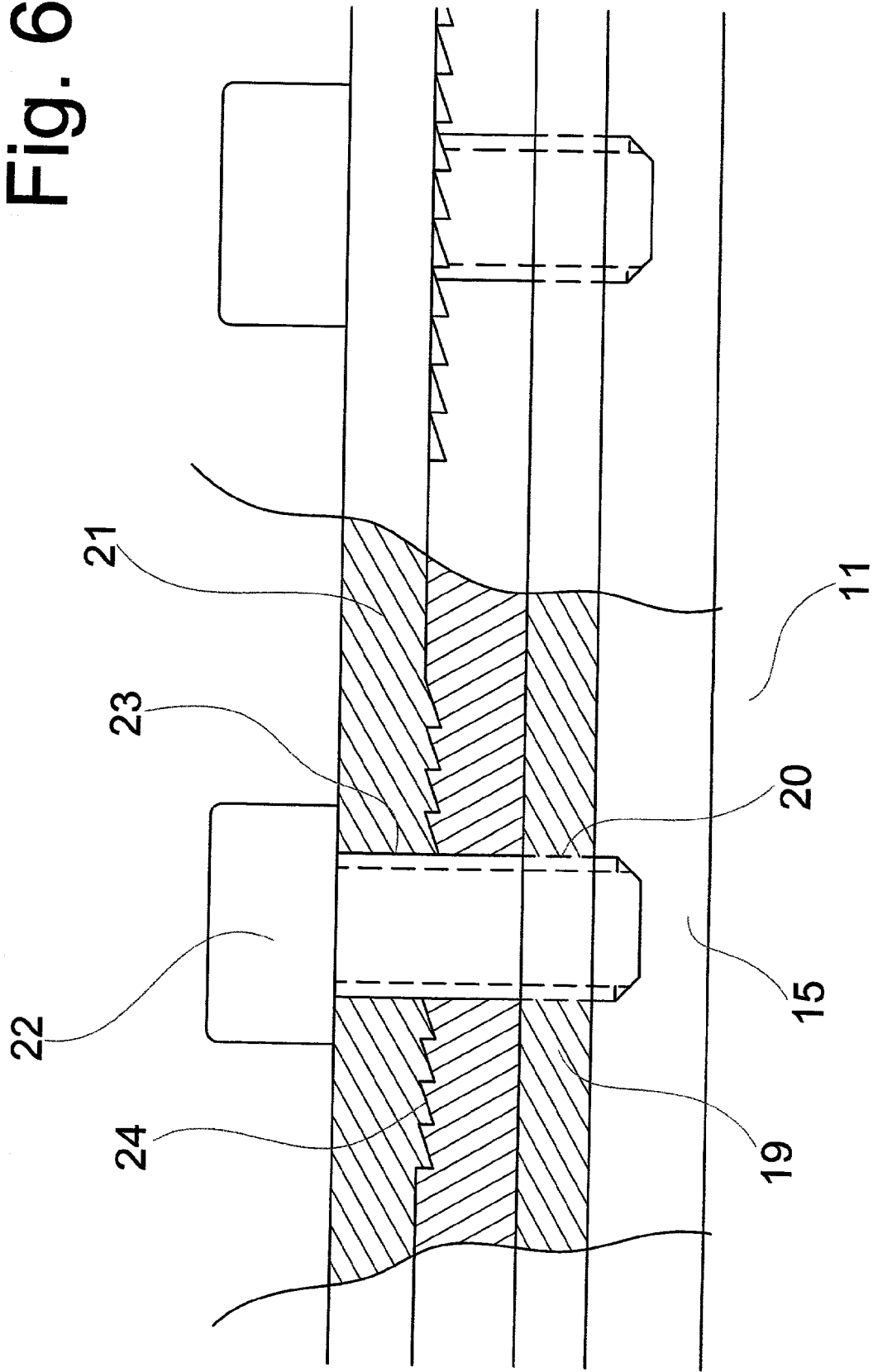
FIG. 6 is a blown up area of the sections in FIG. 3, showing protrusions or contact grips.

The end element or fitting 13, which may have a through or blind central hole and/or at least one internal or external threaded zone 16 as in the example in FIGS. 4 to 6, is, in preference, made using a four-sided external walls profile identical to the hollow bar one or section pipe 11, which has, therefore, with longitudinal channel shaped grooves 17, and an end cylindrical section 18 to fit into the hole 14 of the hollow bar 11 to which it is to be connected.

Figure 2:
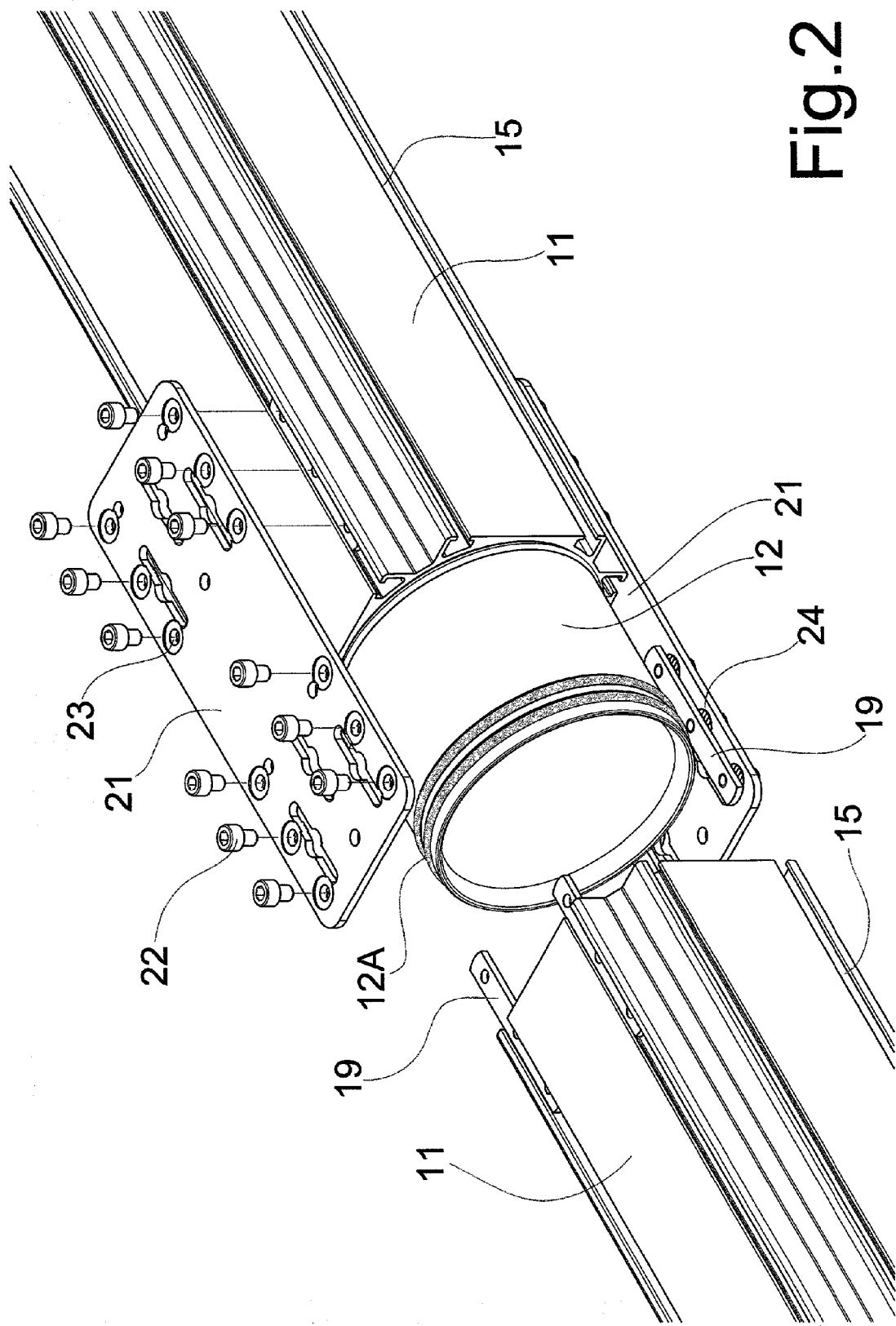
FIG. 2 is a perspective view of two pieces of hollow bar before being connected using the devices in the present invention.
Figure 3:
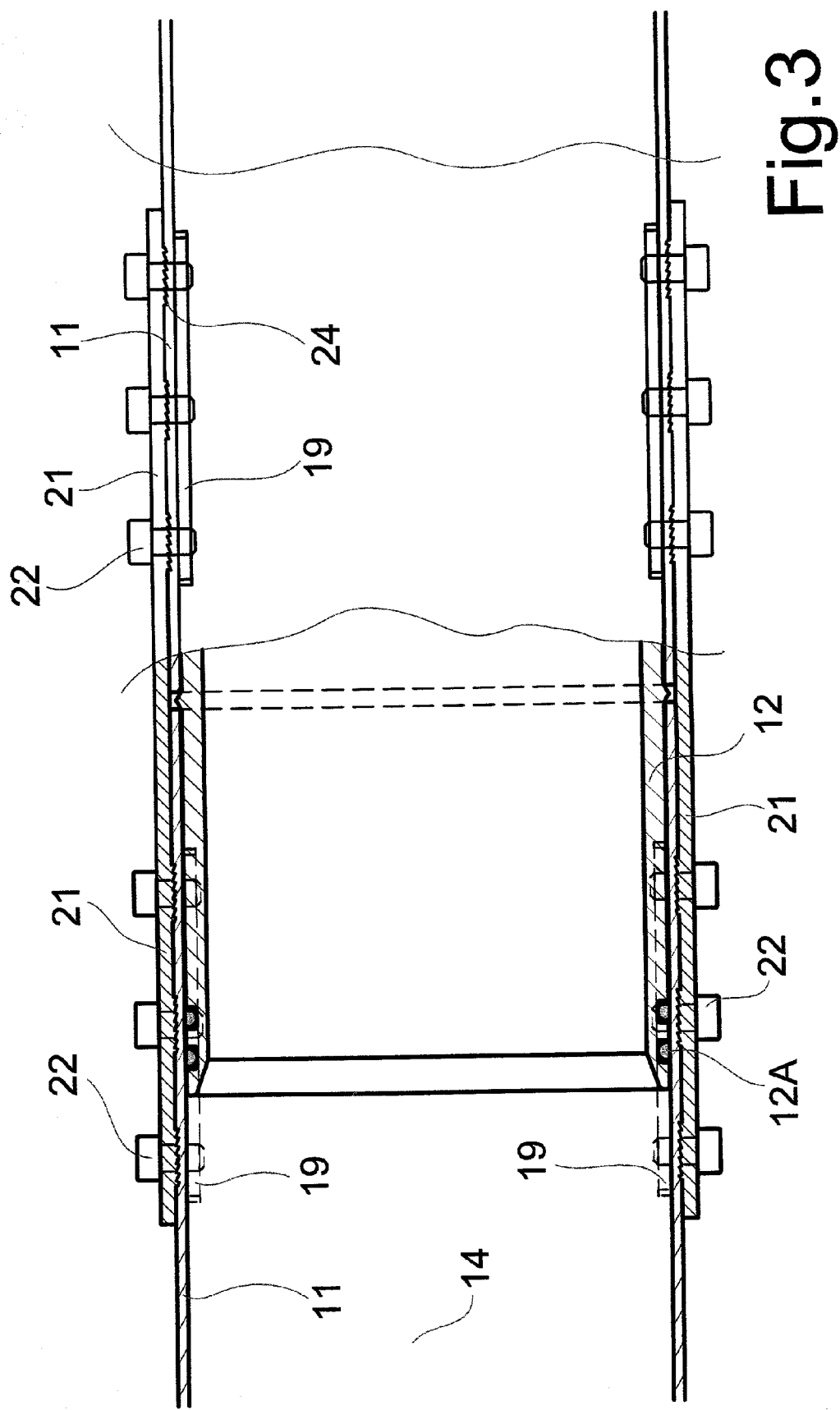
FIG. 3 is a longitudinal sectional view of the bars in FIG. 2 once they have been connected.

The union between the two bars or identical section pipes 11—FIGS. 2 and 3—is achieved by inserting the tubular fitting 12, inserting seal 12A in the hole at the adjacent ends of the bars, and using the connecting means on the two opposite sides of the bar itself.

A hollow bar or section pipe 11 and an element or end fitting 13 are connected in the same way and with the use of the same means of connection by inserting, always interposing at least one seal, the cylindrical section 18 of said element or fitting 13 into the hole 14 at the adjacent end of said bar.

The connection means include anchoring plates 19 which fit into the channel shaped grooves 15, 17 and each one having threaded holes 20, a connecting plate 21 which rests on one face of elements 11, 13 to be connected, bridging the adjacent ends, and screws 22 placed in holes 23 made in the connecting plate 22 and screwed into the threaded holes 20 in the anchoring plates. In this way, by tightening the screws 22, the opposed and combined action of the anchoring plates and connection plate achieves mechanical blocking, preventing detachment.

In order to improve this blocking action and to ensure assembly even in the face of high operating pressures and stress as is experienced, at least the supporting surfaces of each connecting plate 21 is designed so as to have protrusions or contact grips 24 capable of penetrating into the surface of the joined elements, physically grasping the latter—FIGS. 3 and 6. The grips or protrusions 24 may also be in the form of knurling, teeth or raised protrusions on the supporting surfaces of plate 22. They may be positioned only around holes 23 for screws 22, as shown in the drawings, and/or on other extensive or limited flat parts of said surfaces of the plate.

In order to further enhance blocking of the connected elements against any possibility of detachment, the anchoring plates 19 can also be designed with protrusions or contact grips exactly the same as those on the plate and used as well to grip the respective parts of the connected elements.

Figure 7:
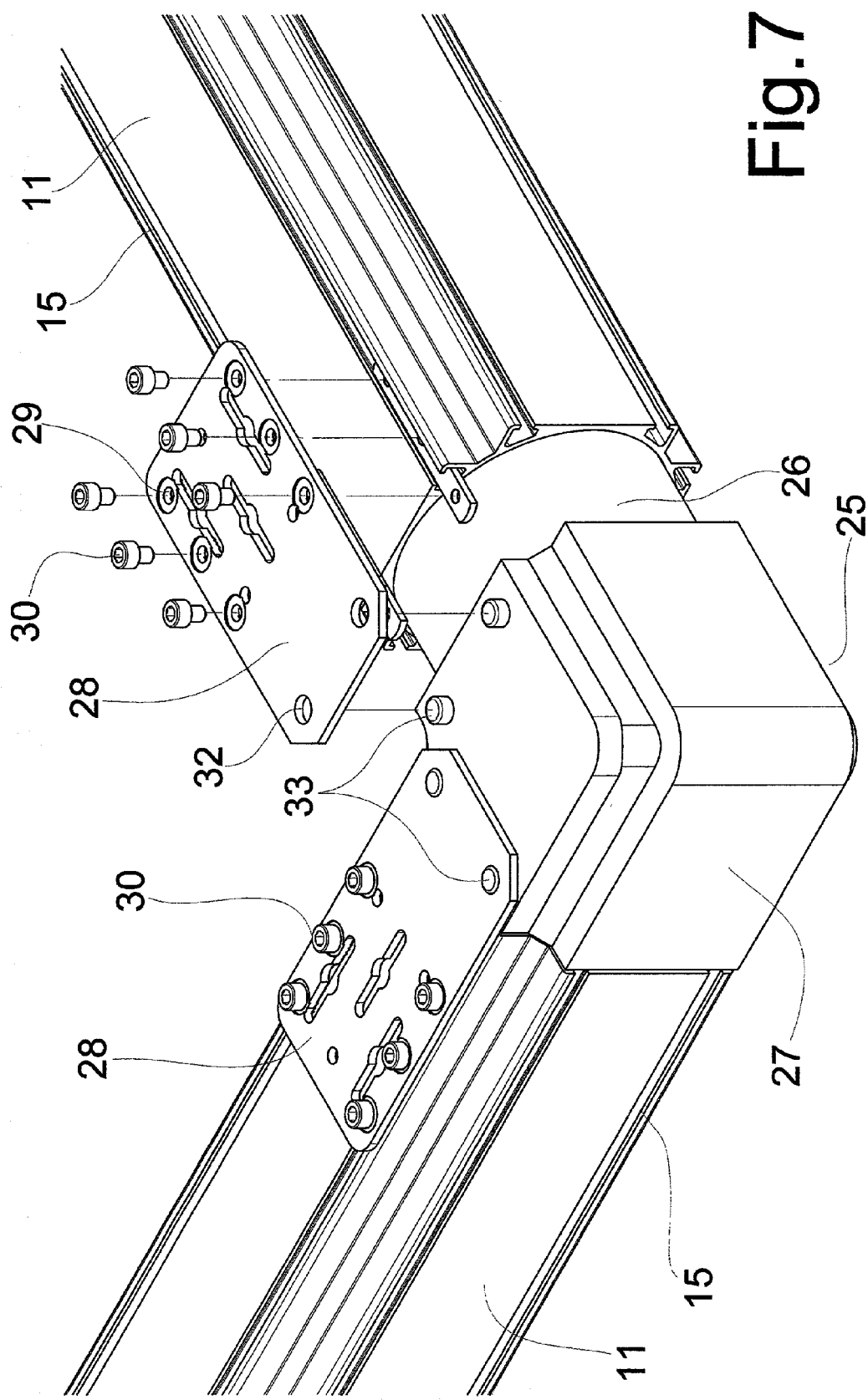
FIG. 7 shows an angular connecting system of two bars or pipe sections with a modified connecting plate.
Figure 8:
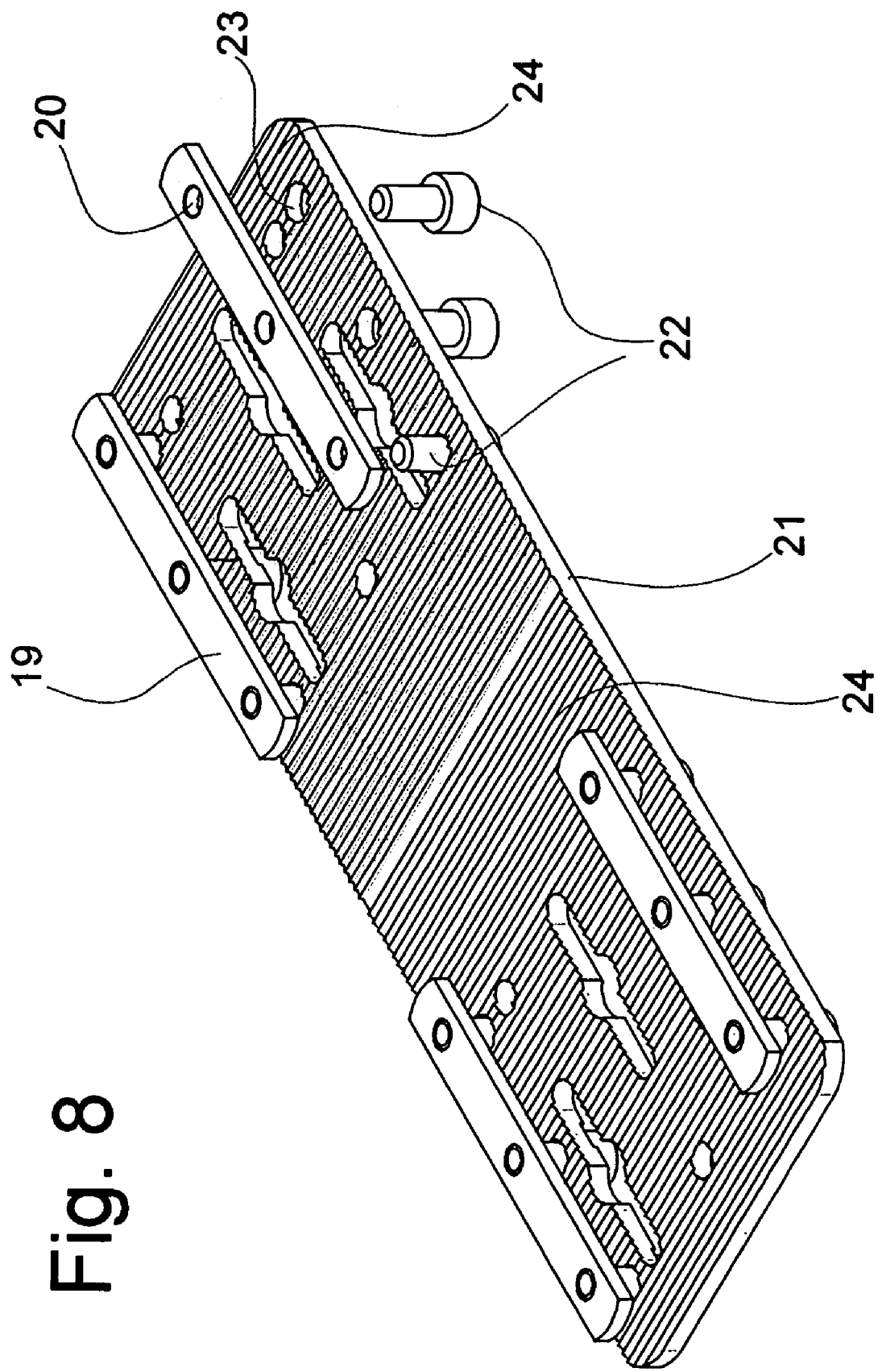
FIG. 8 is a view of protrusions or contact grins on a whole area of a supporting surface of the connecting plate.

Worthy of note is the fact that the tubular joints 12 and the connecting plates 21 may be straight, corner shaped or T shaped etc, depending on the linear or angular layout of the sections 11 and 13 to be connected. However, the hollow bars or section pipes may be laid out and connected at right angles, at a T or cross jointed even with the interposition of joints 25 with two, three or more cylindrical branches 26 which lead off from an intermediate prism shaped body 27. In this case it could be better or easier with regard to connecting and resistance to detachment, to use a connecting plate 28 which is designed with protrusions or grips 24, but having, an area, where there are holes 29 for anchoring screws 30 to tighten onto the anchoring plates 31 fitted into the grooves of a bar or pipe, and in another area, one or more additional holes 32 which are to line up with similar pins 33 protruding from the intermediate body 27 of the fitting, as shown in FIG. 7.

The invention claimed is:

1. A device for connecting and blocking hollow elements used as piping for fluids, where each hollow element has a central hole and C shaped grooves running along its walls and opening outwards, and where plugs or anchoring plates are provided which can be inserted singularly into the channel shaped grooves of the adjacent elements to be connected, one connecting plate resting on one wall of said adjacent elements, and anchoring screws inserted into holes in said connection plate and screwed into said anchoring plates to block the plate on said adjacent elements, characterised in that at least the connecting plate has protrusions or contact grips designed to physically penetrate into the surface of the elements to be connected when the connecting plate is anchored to the anchoring plate by the screws.

2. The connecting and blocking device according to claim 1, wherein said elements to be connected are one of hollow bars, section pipes and end fittings to be connected to said bars or section pipes, and wherein said protrusions or contact grips are provided on the connecting plate and or and on the anchoring plugs.

3. Connecting and blocking device according to claim 1, wherein said protrusions or contact grips are in the form of knurling, teeth or points protruding from a supporting surface of the anchoring plates.

4. Connecting and blocking device according to claim 1, wherein said protrusions or contact grips are located around the holes for the screws.

5. Connecting and blocking device according to claim 1, wherein said protrusions or contact grips are provided on a limited area or on the whole area of a supporting surface of the connecting plate.

6. A connection arrangement comprising:
first and second hollow elements each defining a hole, said first hollow element defining a C shaped groove;
an anchoring plate inserted into said C shaped groove of said first hollow element;
a fastener connected to said anchoring plate;
a connecting plate connected to said anchoring plate through said fastener, said connecting plate being connected to said second hollow element;
a protrusion adjacent said first hollow element and extending from one of said anchoring plate and said connecting plate, said protrusion and said first hollow element being formed of a material and said protrusion having a shape to cause said protrusion to penetrate into a surface of said first hollow element when said fastener pulls said anchoring plate to said connecting plate.

7. Connecting and blocking device according to claim 2, wherein said protrusions or contact grips are in the form of knurling, teeth or points protruding from a supporting surface of the anchoring plates.

8. Connecting and blocking device according to claim 2, wherein said protrusions or contact grips are located around the holes for the screws.

9. Connecting and blocking device according to claim 3, wherein said protrusions or contact grips are located around the holes for the screws.

10. Connecting and blocking device according to claim 3, wherein said protrusions or contact grips are provided on a limited area or on the whole area of a supporting surface of the connecting plate.

11. Connecting and blocking device according to claim 2, wherein the connecting plate has additional holes to receive pins which project from a body of a two or three way joint, placed between and connecting two or more hollow bars or section pipes.

12. Connecting and blocking device according to claim 3, wherein the connecting plate has additional holes to receive pins which project from a body of a two or three way joint, placed between and connecting two or more hollow bars or section pipes.

13. Connecting and blocking device according to claim 4, wherein the connecting plate has additional holes to receive pins which project from a body of a two or three way joint, placed between and connecting two or more hollow bars or section pipes.

14. Connecting and blocking device according to claim 5, wherein the connecting plate has additional holes to receive pins which project from a body of a two or three way joint, placed between and connecting two or more hollow bars or section pipes.

15. A device for connecting and blocking hollow elements used as piping for fluids, where each hollow element has a central hole and C shaped grooves running along its walls and opening outwards, where plugs or anchoring plates are provided which can be inserted singularly into the channel shaped grooves of the adjacent elements to be connected, one connecting plate resting on one wall of said adjacent elements, and anchoring screws inserted into holes in said connection plate and screwed into said anchoring plates to block the plate on said adjacent elements, characterised in that at least the connecting plate has protrusions or contact grips designed to physically penetrate into the surface of the elements to be connected when the connecting plate is anchored to the anchoring plate by the screws, said protrusions or contact grips are in a form of knurling, teeth or points protruding from a supporting surface of the connecting plate.

16. A device for connecting and blocking hollow elements used as piping for fluids, where each hollow element has a central hole and C shaped grooves running along its walls and opening outwards, and where plugs or anchoring plates are provided which can be inserted singularly into the channel shaped grooves of the adjacent elements to be connected, one connecting plate resting on one wall of said adjacent elements, and anchoring screws inserted into holes in said connection plate and screwed into said anchoring plates to block the plate on said adjacent elements, characterised in that at least the connecting plate has protrusions or contact grips designed to physically penetrate into the surface of the elements to be connected when the connecting plate is anchored to the anchoring plate by the screws, the connecting plate has additional holes to receive pins which project from a body of a two or three way joint, placed between and connecting two or more hollow bars or section pipes.

17. The arrangement according to claim 6, wherein said protrusions are in the form of knurling, teeth or points protruding from a supporting surface of the connecting plate.

18. An arrangement in accordance with claim 17, wherein:

said second hollow element defines a C shaped groove;

said anchoring plate is inserted into said C shaped groove of said first hollow element and inserted into said C shaped groove of said second hollow element;

another protrusion is arranged adjacent said second hollow element and extends from one of said anchoring plate and said connecting plate, said another protrusion and said second hollow element being formed of a material and said another protrusion having a shape to cause said another protrusion to penetrate into a surface of said second hollow element when said fastener pulls said anchoring plate to said connecting plate.

19. An arrangement in accordance with claim 17, wherein:

said connecting plate is connected to said second hollow element by pins.

20. An arrangement in accordance with claim 18, wherein:

said anchor plate is formed as two separate parts separately inserted into said C shaped grooves.

* * * * *